(12) United States Patent
Son et al.

(10) Patent No.: US 8,830,264 B2
(45) Date of Patent: Sep. 9, 2014

(54) METHOD AND APPARATUS FOR PROVIDING IMAGE TO DEVICE

(71) Applicant: KT Corporation, Seongnam-si (KR)

(72) Inventors: Eui-Seung Son, Incheon (KR);
Won-Yeol Lee, Seoul (KR);
Eun-Kyoung Paik, Seongnam-si (KR);
Hyun-Pyo Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 13/650,847

(22) Filed: Oct. 12, 2012

(65) Prior Publication Data

US 2013/0097649 A1 Apr. 18, 2013

(30) Foreign Application Priority Data

Oct. 12, 2011 (KR) .......................... 10-2011-0104134

(51) Int. Cl.
*G09G 5/00* (2006.01)
*H04N 21/422* (2011.01)
*H04N 21/485* (2011.01)
*H04N 21/41* (2011.01)
*H04N 21/6587* (2011.01)
*H04N 21/258* (2011.01)
*H04N 7/18* (2006.01)

(52) U.S. Cl.
CPC .......... *H04N 7/181* (2013.01); *H04N 21/42222* (2013.01); *H04N 21/4858* (2013.01); *H04N 21/4126* (2013.01); *H04N 21/42208* (2013.01); *H04N 21/6587* (2013.01); *H04N 21/25825* (2013.01)
USPC ............... 345/629; 725/74; 725/80; 725/105; 725/116; 725/133; 345/619; 345/632; 345/633

(58) Field of Classification Search
USPC .............. 725/74, 80, 105, 116, 133; 345/619, 345/629, 632, 633
See application file for complete search history.

(56) References Cited

U.S. PATENT DOCUMENTS

2008/0259093 A1* 10/2008 Tseng ........................... 345/619
2012/0249586 A1* 10/2012 Wither et al. ................. 345/633

* cited by examiner

*Primary Examiner* — Mulugeta Mengesha
(74) *Attorney, Agent, or Firm* — Sughrue Mion, PLLC

(57) ABSTRACT

An method for providing an image to a multiple number of devices is disclosed. The method includes providing a part of the image to a first device, receiving, from a second device, second position information of the second device relative to first position information of the first device, and providing, to the second device, another part of the image corresponding to the position information of the second device.

18 Claims, 10 Drawing Sheets

METHOD AND APPARATUS FOR PROVIDING IMAGE TO DEVICE

CROSS-REFERENCE TO RELATED APPLICATION

This application claims priority from Korean Patent Application No. 10-2011-0104134, filed on Oct. 12, 2011 in the Korean Intellectual Property Office, the entire content of which is incorporated herein by reference.

BACKGROUND

1. Field

Methods and apparatuses consistent with exemplary embodiments relate to a method and an apparatus for providing an image to each of a multiple number of devices.

2. Description of the Related Art

With the propagation of super high-speed communication networks and the tendency to fuse broadcasting and communication technologies, internet protocol television (IPTV) has become a major part of the broadcasting communication industry such that a user selectively receives his/her desired contents through a super high-speed communication network.

In case of conventional broadcasting, viewers have passively viewed contents transmitted from a broadcasting station. In case of the IPTV, however, viewers can view their desired contents at their desired time, such that the convenience and satisfaction of viewers have dramatically improved.

An IPTV service provides a multiple angle service whereby the same content is captured by a multiple number of cameras, and a viewer selects his/her desired camera angle to view the content. The greatest advantage of the multiple angle service is to enable a viewer to select and view his/her desired screen, thereby increasing the selectivity and the satisfaction of the viewer.

However, in case of the conventional multiple angle service, viewers can only view a video edited by a broadcasting station to fit in a TV screen. Thus, viewers cannot view videos outside the TV screen.

SUMMARY

In order to address the above-described conventional problems, an exemplary embodiment provides a method and a device for providing an image to a multiple number of devices by recognizing relative positions of the multiple number of devices based on position information.

According to an aspect of an exemplary embodiment, a method for providing an image to a multiple number of devices is provided. The method includes providing a first part of the image to a first device, receiving second position information of the second device relative to position information of the first device, and providing, to the second device, a second part of the image corresponding to the second position information of the second device.

The second position information may be received from the second device. The second position information of the second device may be determined based on an image that is displayed on the first device and obtained by the second device.

The second position information of the second device may be determined by using at least one from among a gyro sensor, an acceleration sensor, and a terrestrial magnetism sensor.

The receiving, from the second device, the second position information of the second device may include: receiving, from the second device, device information of the second device.

The providing, to the second device, the second part of the image may comprise: selecting a partial image from the image based on the second position information of the second device; processing the partial image based on device information of the second device; and providing the processed partial image as the second part of the image to the second device.

According to an aspect of another exemplary embodiment, a method for providing an image to a multiple number of devices is provided. The method includes receiving an image from a server, providing, to the first device, a first part of the image processed based on first device information of the first device, receiving second position information of the second device relative to the first position information of the first device, and providing, to the second device, a second part of the image corresponding to the second position information of the second device.

The second position information of the second device may be received from the second device.

The providing to the second device may comprise: selecting a partial image from the image based on the second position information of the second device; processing the partial image based on the second device information of the second device; and providing the processed partial image as the second part of the image to the second device.

The providing to the second device may comprise: sending, to the server, information of the image and the position information of the second device; receiving, from the server, the second part of the image; and providing the second part of the image to the second device.

The second part of the image may be selected, by the server, from the image based on the second position information of the second device. Also, the second position information of the second device may be determined based on an image that is displayed on the first device and obtained by the second device.

The second position information of the second device may be determined by using at least one from among a gyro sensor, an acceleration sensor, and a terrestrial magnetism sensor. A first part of the image may be synchronized with the second part of the image According to an aspect of another exemplary embodiment, a method for receiving a partial image of an image by a second device is provided. The method includes sensing second position information of the second device relative to first position information of the first device, sending the sensed second position information of the second device to a device, and receiving, from the device, a partial image corresponding to the second position information of the second device.

The sensed second position information of the second first device may be determined based on an image that is displayed on the first device and obtained by the second device.

The received partial image may be displayed on a screen of the second device, and controlled based on at least one from among a rotation command, an expansion command, and a reduction command input from a user interface.

According to an aspect of another exemplary embodiment, an apparatus for providing an image to a multiple number of devices is provided. The apparatus includes a first image provider configured to provide a first part of the image to a first device, position information receiver configured to receive second position information of a second device relative to position information of the first device, and a second image provider configured to provide, to the second device, a second part of the image corresponding to the second position information of the second device.

The position information receiver may receive the second position information from the second device.

The second position information of the second device may be determined based on an image that is displayed on the first device and obtained by the second device.

The second position information of the second device may be determined by using at least one from among a gyro sensor, an acceleration sensor, and a terrestrial magnetism sensor.

The position information receiver may receive, from the second device, device information of the second device.

According to another exemplary embodiment, there is provided a method for displaying different angular perspectives from a particular view of a subject, on a plurality display devices, respectively. The method comprises: providing one angular perspective of the subject to a first display device of the plurality display devices; receiving second position information of a second display device of the plurality display devices, the second position information being relative to first position information of the first display device; and providing, to the second display device, a second angular perspective of the subject based on the second position information of the second display device.

The subject is at least one from among an event, a scene, an activity, and a spectacle. And the particular view is a panoramic view.

In accordance with an exemplary embodiment, it is possible to provide a specific angle image desired by viewers to a multiple number of devices, respectively, by recognizing relative positions of the multiple number of devices and seamlessly providing screens other than fixed multiple angle videos provided by a broadcasting station.

BRIEF DESCRIPTION OF THE DRAWINGS

Non-limiting and non-exhaustive exemplary embodiments will be described in conjunction with the accompanying drawings. Understanding that these drawings depict only several exemplary embodiments in accordance with the disclosure and are, therefore, not intended to limit its scope, the disclosure will be described with specificity and detail through use of the accompanying drawings, in which.

DETAILED DESCRIPTION OF EXEMPLARY EMBODIMENTS

Figure 1:
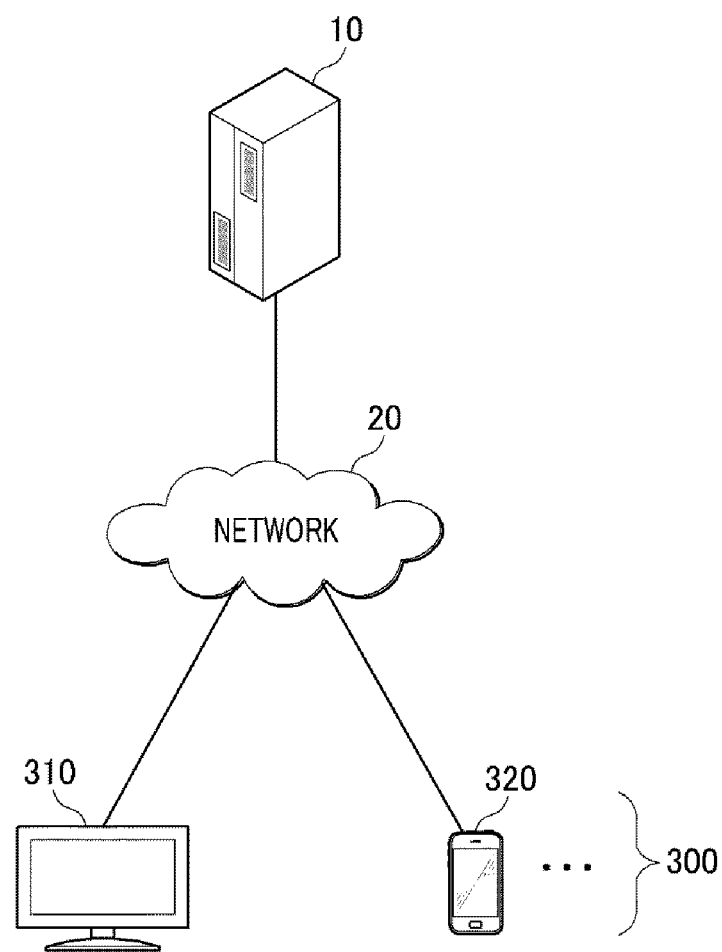
FIG. 1 is a whole schematic view of a system for providing an image in accordance with an exemplary embodiment.

Hereinafter, exemplary embodiments will be described in detail with reference to the accompanying drawings so that the present inventive concept may be readily implemented by those skilled in the art. However, it is to be noted that the present disclosure is not limited to the exemplary embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a whole schematic view of a system for providing an image in accordance with an exemplary embodiment.

As illustrated in FIG. 1, a system for providing an image in accordance with an exemplary embodiment includes an image providing server 10 and a user device 300.

The image providing server 10 is connected to the user device 300 through a network 20.

The network 20 may be embodied as a wired network such as a local area network (LAN), a wide area network (WAN), or a value added network (VAN), or any type of a radio network such as a mobile radio communication network or a satellite communication network.

The user device 300 may be embodied as a computer or a mobile device that can be connected to a remote server through a network. Here, the computer is, for example, a notebook, a desktop, or a laptop that are equipped with a central processing unit (CPU) and a memory. The mobile device, for example, includes any type of a handheld-based radio communication device such as a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access(CDMA)-2000, a W-code division multiple access (W-CDMA), a wireless broadband Internet (WIBRO) device, a smart phone, a tablet device, and a pad.

The image providing server 10 provides an image to the user device 300 through the network 20. The image is, for example, at least one from among multiple angle videos captured at multiple angles by a multiple number of cameras. The image may be at least one part of a multiple angle video, or a still image captured from the multiple angle videos.

Here, the image providing server 10 may be provided with multiple angle videos from a content providing server or a content provider, e.g., a program provider, a data provider, a ground wave provider, or an IPTV content provider.

First, the image providing server 10 provides, to the first device 310, video data for multiple angle videos captured at multiple angles. Here, the multiple angle videos are videos acquired by capturing the same content at various angles or positions. The orientations of the optical axes of the cameras that produce the multiple angle videos are different from each other in accordance with an exemplary embodiment. The orientations of the optical axes of the cameras that produce the multiple angle videos may be the same or parallel in accordance with another exemplary embodiment. The cameras may be adjacent. The multiple angle videos may represent synthesis videos obtained by synthesizing the videos acquired by capturing the same content at various angles or positions.

Once the image providing server 10 provides the video data for the multiple angle videos to the first device 310, the first device 310 displays the multiple angle videos on a screen thereof based on the video data provided by the image providing server 10. However, in accordance with another exemplary embodiment of the present disclosure, once the image providing server 10 provides the video data for the multiple angle videos to the first device 310, the first device 310 may display only one part or one video of the multiple angle videos on the screen thereof based on the video data provided by the image providing server 10. An example where the multiple angle videos are displayed on the device will be described later with reference to FIG. 4.

The image providing server 10 receives position information of the second device 320 relative to position information of the first device 310. The image providing server 10 provides a video of the multiple angle videos to the first device 301. The image providing server 10 provides another video of the multiple angle videos to the second device 302 based on the position information of the second device 320. A user, who is watching the video of the multiple angle videos through the first device 310, may watch another video of the multiple angle videos through the second device 320. In this case, the image providing server 10 may receive device information of the second device 320 as well as the position information of the second device 320.

To determine the position information of the second device 320, the second device 320 captures, or obtains, a part of the multiple angle videos being displayed on the first device 310 and generates a captured video of the first device 310. Based on the captured video of the first device 310, the second device 320 sets a reference position of the first device 310. The reference position of the first device 310 may be position information of the first device 310. The second device 320 also may sense at least one from among position, direction and displacement of the second device 320 by using at least one from among a gyro sensor, an acceleration sensor, and a terrestrial magnetism sensor. Based on at least one from among the captured video of the first device 310 and the sensed at least one from among the position, direction and displacement of the second device 320, the second device 320 may determine the position information of the second device 320 relative to position information of the first device 310.

However, the method for setting the reference position of the first device 310 is not construed as being limited to the above-described exemplary embodiment and may be modified in accordance with various exemplary embodiments. For example, the first device 310 or the image providing server 10 may extract a frame image (e.g., a frame image showing a frame of a TV device if the first device 310 is a TV device) of the first device 310. Based on the extracted frame image of the first device 310, the reference position of the first device 310 may be set. As another example, the reference position of the first device 310 may be set based on a default value stored in the first device 310 or the image providing server 10.

The second device 320 measures position of the second device 320 by using one from among a gyro sensor, an acceleration sensor, and a terrestrial magnetism sensor. Based on the reference position of the first device 310 and the position of the second device 320, the second device 320 acquires the position information of the second device 320 relative to position information of the first device 310. Here, the second device 320 may recognize the relative position between the first device 310 and the second device 310 when the user moves the second device 320.

The position information of the second device 320 is determined by the reference position of the first device 310 set in the second device 320 based on the captured video of the first device 310. The second device 320 sends the position information of the second device 320 to an image providing device. The image providing device may be the image providing server 10.

Based on the position information of the second device 320, the image providing server 10 provides video data for a specific angle video of the multiple angle videos to the second device 320. In another exemplary embodiment, the image providing server 10 may provide a part of an image corresponding to a specific angle video of the multiple angle videos or all of the multiple angle videos. The image may be a still image of the multiple angle videos. An image corresponding to a "specific angle video" may be an image from a particular vantage point or relative position of one device with respect to another device.

The image providing server 10 may provide the video data to the second device 320 based on the video data that have been transmitted to the first device 310. For example, the image providing server 10 may transmit video data for the specific angle video of the multiple angle videos to the first device 310 based on the reference position of the first device 310 and transmit video data for another angle video of the multiple angle videos to the second device 320 based on the position information of the second device 320 relative to position information of the first device 310. In another exemplary embodiment, the image providing server 10 may provide a first part of an image corresponding to the specific angle video of the multiple angle videos or all of the multiple angle videos. The image providing server 10 may provide a second part of an image corresponding to a specific angle video of the multiple angle videos or all of the multiple angle videos.

The image providing server 10 searches a corresponding angle video from the multiple angle videos based on the position information of the second device 320 relative to position information of the first device 310. The image providing server 10 performs image processing to video data for the searched angle video based on the device information of the second device 320 for display on the second device 320. Once the image providing server 10 provides the video data that have been subject to the image processing, to the second device 320, the second device 320 displays the angle video based on the provided video data.

The second device 320 is provided with a video captured at a different angle among the multiple angle videos being displayed on the first device 310, through the second device 320, so that the user can freely view his/her desired video while the video is not exposed to third parties who are viewing the first device 310 together with the user.

The image providing server 10 acquires the information of the relative position between the first device 310 and the second device 320, so that a video, rather than a fixed multiple angle video being provided by a broadcasting station and being displayed on the first device 310, can be displayed on the second device 320.

Figure 2:
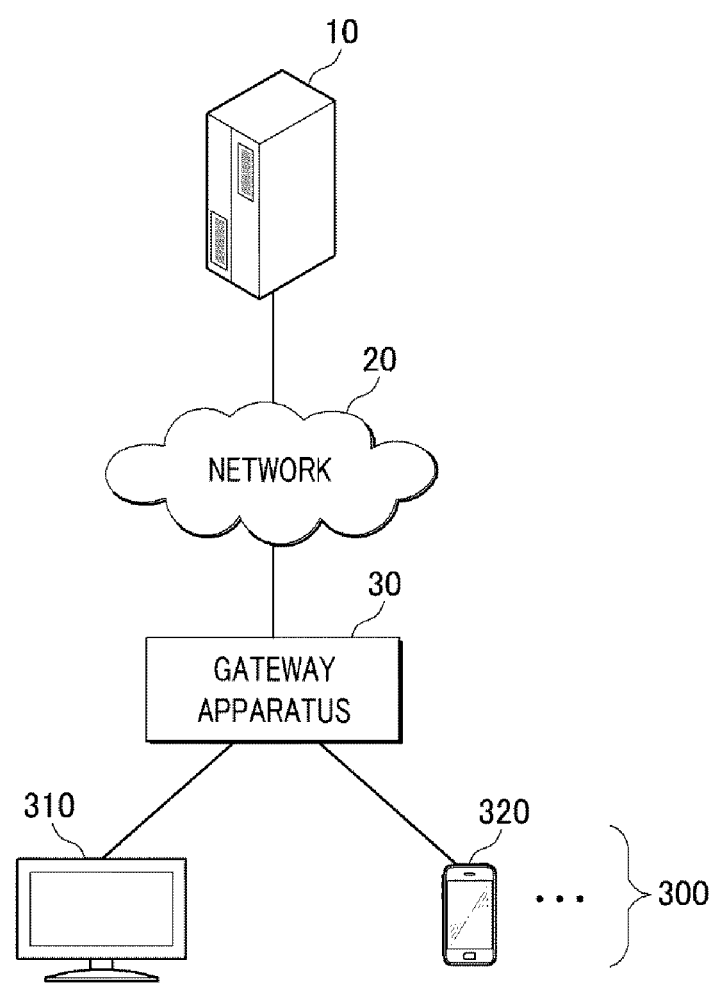
FIG. 2 is a whole schematic view of a system for providing an image in accordance with another exemplary embodiment.

FIG. 2 is a whole schematic view of a system for providing an image in accordance with another exemplary embodiment.

As illustrated in FIG. 2, the image providing server 10 is connected to a gateway apparatus 30 through the network 20. The gateway apparatus 30 is connected to the user device 300.

The image providing server 10 provides the multiple angle videos to the gateway apparatus 30 through the network 20.

The gateway apparatus 30 may be a server for managing traffic input to a home network, or a set-up box.

First, the first device 310 requests multiple angle videos captured at multiple angles from the image providing server 10 through the gateway apparatus 30. In this case, the first device 310 also transmits the device information of the first device 310 to the gateway apparatus 30. Device information of first device 310 may be specifications of the first device 310 such as dimension information, display information, network connectivity information, memory information, applications information, OS information, audio information, video information, and sensors information.

The image providing server 10 provides video data for the multiple angle videos requested from the first device 310, to the gateway apparatus 30.

Once the gateway apparatus 30 performs image processing to the provided video data based on the device information of the first device 310 and provides the video data to the first device 310, the first device 310 displays the video data that have been subject to the image processing, on the screen of the first device 310. In accordance with another exemplary embodiment, once the gateway apparatus 30 provides the video data to the first device 310, the first device 310 may display only a partial area of an image corresponding to one or all of the multiple angle videos on the screen of the first device 310 based on the provided video data.

In this case, the user who wants to view a video beyond the screen being displayed on the first device 310 captures the video being displayed on the first device 310 through the second device 320 to generate the captured video of the first device 310. The second device 320 sets the reference position of the first device 310 based on the captured video of the first device 310.

However, the method for setting the reference position of the first device 310 is not construed as being limited to the above-described exemplary embodiment and may be modified in accordance with various exemplary embodiments. For example, the first device 310, the image providing server 10, or the gateway apparatus 30 may extract a frame image (e.g., a frame image showing a fame of a TV device if the first device 310 is a TV device) of the first device 310 and set the reference position of the first device 310 based on the extracted frame image of the first device 310. As another example, the reference position of the first device 310 may be set based on a default value stored in the first device 310, the image providing server 10, or the gateway apparatus 30.

The second device 320 measures position of the second device 320 by using one from among a gyro sensor, an acceleration sensor, and a terrestrial magnetism sensor. Based on the reference position of the first device 310 and the position of the second device 320, the second device 320 determines the position information of the second device 320 relative to position information of the first device 310. The position information of the second device 320 may be relative position information of the second device 320.

The second device 320 sends the position information of the second device 320 relative to position information of the first device 310, to an image providing device. The image providing device may be the gateway apparatus 30. In this case, the second device 320 may also transmit the device information of the second device 320 to the gateway apparatus 30. Device information of second device 320 may be specifications of the 320 device 320 such as dimension information, display information, network connectivity information, memory information, applications information, OS information, audio information, video information, and sensors information.

The gateway apparatus 30 searches video data for the corresponding angle video based on the position information of the second device 320 relative to position information of the first device 310.

In this case, if the searched video data for the angle video are not included in the video data received by the first device 310 from the gateway apparatus 30, the gateway apparatus 30 transmits the information of the angle videos requested by the user and the position information of the second device 320 to the image providing server 10.

Subsequently, the image providing server 10 searches the corresponding angle videos by using the received information of the angle videos and the position information of the second device 320, and transmits video data for the searched angle videos to the gateway apparatus 30.

The gateway apparatus 30 performs image processing on the video data for the searched angle videos for display on the second device 320 and provides the video data to the second device 320. In this case, the searched angle videos may represent a partial area of the multiple angle videos.

The gateway apparatus 30 may provide the video data to the second device 320 based on the video data that have been transmitted to the first device 310. For example, the gateway apparatus 30 may transmit video data for a specific angle video of the multiple angle videos to the first device 310 based on the reference position of the first device 310, and transmit video data for another angle video of the multiple angle videos to the second device 320 based on the position information of the second device 320. In another exemplary embodiment, a specific angle video may represent a partial area of the multiple angle videos. Another angle video may represent a different area from the partial area in the multiple angle videos.

The second device 320 displays the videos based on the provided video data.

If the user fixes the videos that he/she is viewing through the second device 320, even if the position of the second device 320 is changed, information of the changed position is not provided to the gateway apparatus 30, so that the video at the fixed position can be maintained.

Since the gateway apparatus 30 executes the function that is executed in the image providing server 10, the load of the image providing server 10 can be reduced.

The gateway apparatus 30 synchronizes the video that has been viewed through the first device 310 and the multiple angle video that is being viewed through the second device 320, so that the delay problem in screens can be solved.

Figure 3:
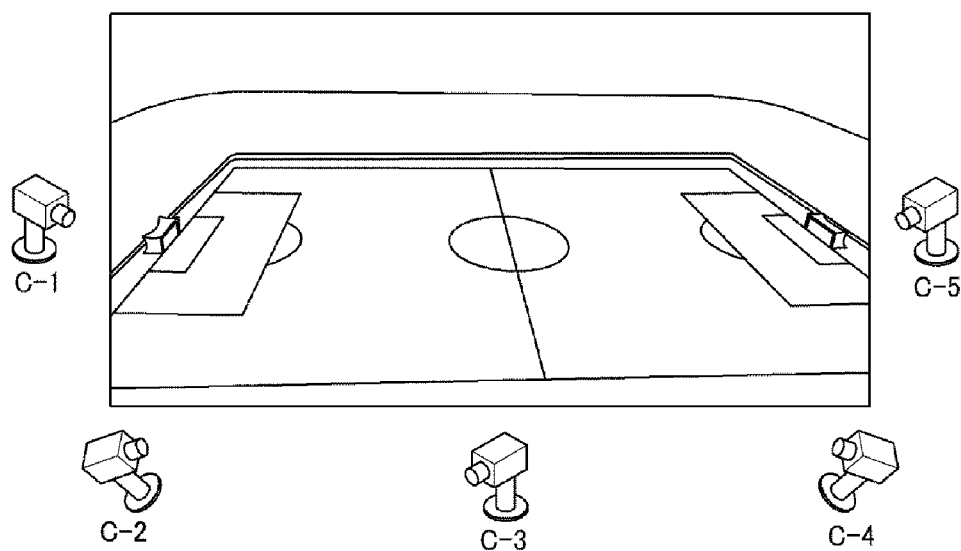
FIG. 3 illustrates an example for acquiring multiple angle images by using a multiple number of cameras.

FIG. 3 illustrates an example for acquiring multiple angle images by using a multiple number of cameras.

In order to enable the image providing server 10 to provide multiple angle videos, videos need to be captured by cameras at different positions. For example, as illustrated in FIG. 3, multiple angle videos of a soccer game can be acquired by capturing the soccer game through five (5) cameras including c-1 to c-5 arranged at different positions.

Figure 4A:
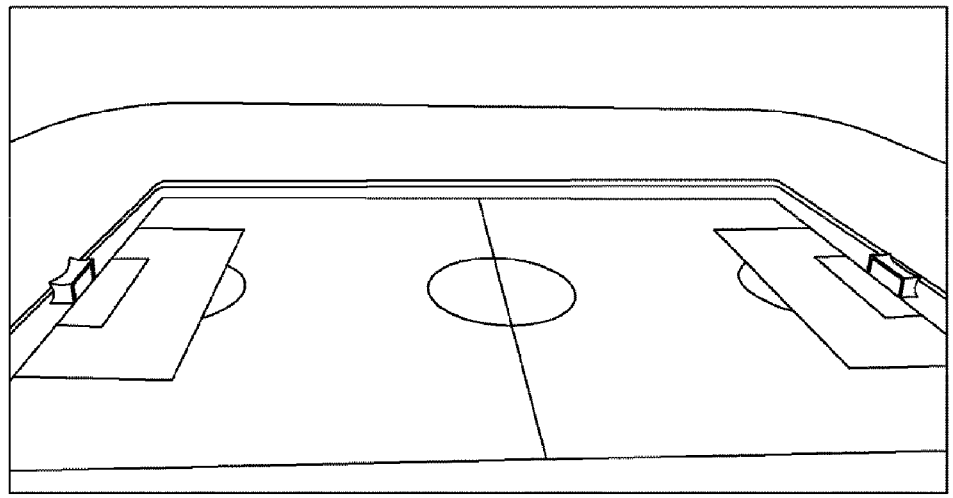
FIGS. 4A and 4B illustrate examples of an image captured by a certain camera.
Figure 4B:
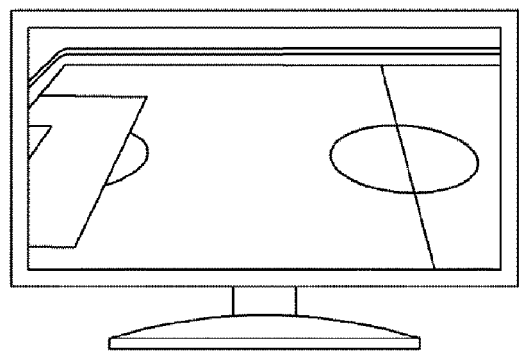

FIGS. 4A and 4B illustrate examples for an image captured by a certain camera.

FIG. 4A shows original videos captured by c-3 of the five (5) cameras illustrated in FIG. 3. It is possible to provide videos, which are larger than the videos that can be viewed on a TV and have a high resolution, to a broadcasting station or the image providing server 10. According to an exemplary embodiment, videos having a high resolution may be defined as multiple angle videos.

FIG. 4B illustrates an example for displaying the videos of FIG. 4A on a TV.

The broadcasting station or the image providing server 10 edits and provides the high-resolution large videos captured by multiple angle cameras to be displayed on a TV. Accordingly, a viewer can only view the videos edited and provided by a content provider.

For example, as illustrated in FIG. 4B, a viewer may only view a partial area of the original videos of FIG. 4A through a first device, i.e., a TV, and cannot view videos such as stands other than the soccer playing field included in the original video. The viewer may view another partial area of the original videos of FIG. 4A through a second device, i.e., a mobile device.

Figure 5:
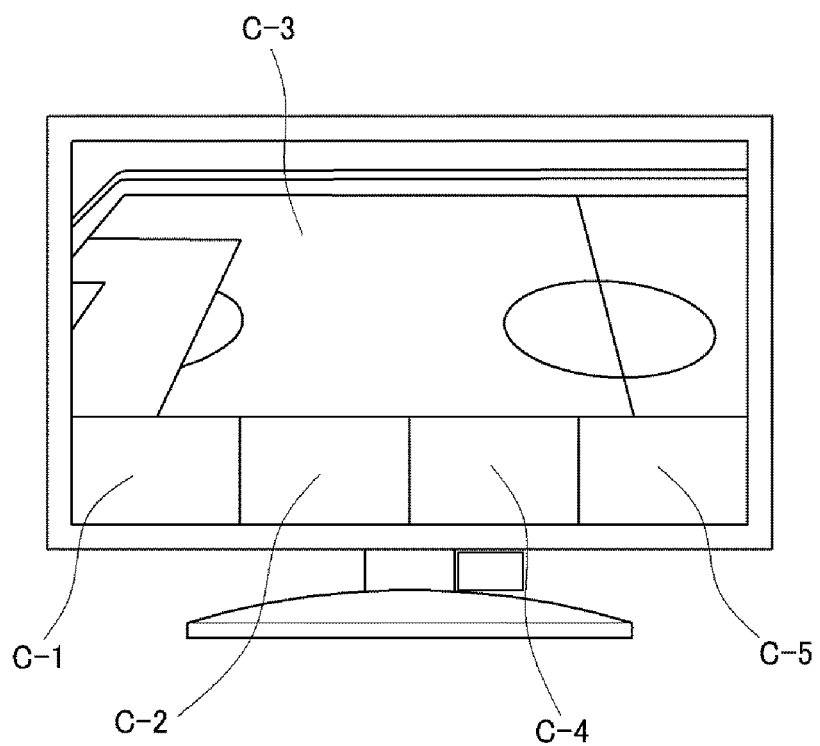
FIG. 5 illustrates an example for providing the multiple angle images acquired in FIG. 3.

FIG. 5 illustrates an example for providing the multiple angle images acquired in FIG. 3.

As illustrated in FIG. 5, videos captured by several multiple angle cameras are viewed on a lower portion of the TV screen. When a viewer selects his/her desired video, the broadcasting station or the image providing server 10 transmits the corresponding video to be reproduced on the TV. In addition to the method for selecting a multiple angle in FIG. 5, it is possible to indicate positions of the cameras with texts or images to provide the multiple angle service.

Figure 6:
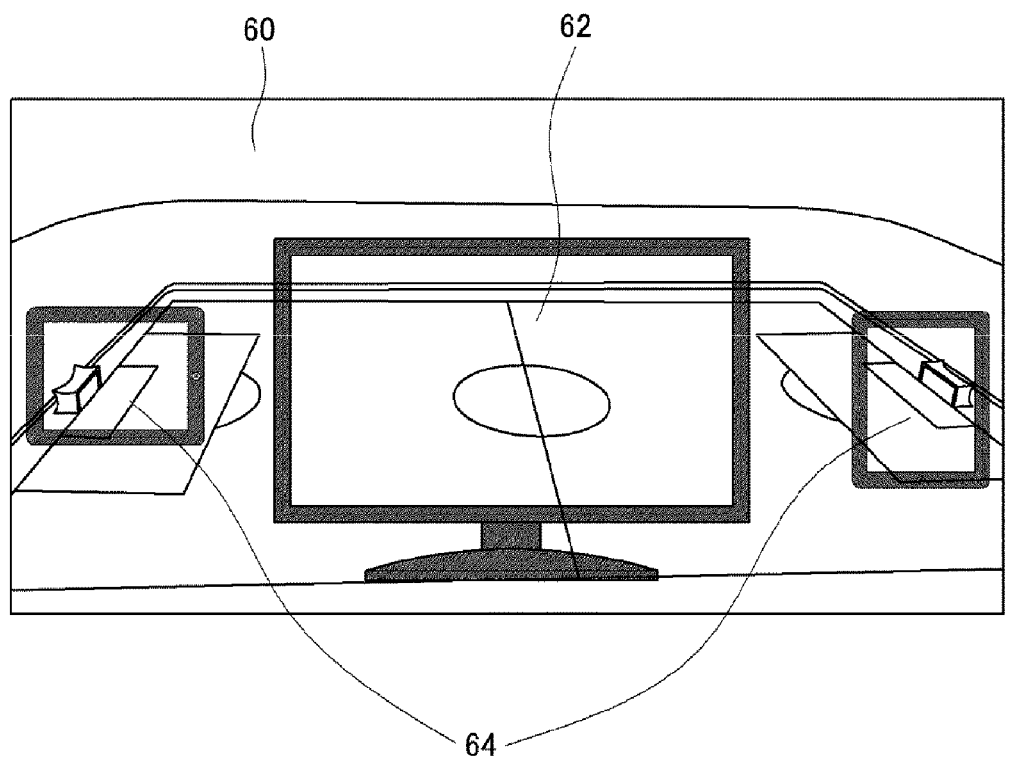
FIG. 6 illustrates an example for providing a part of an image to each of a multiple number of devices in accordance with an exemplary embodiment.

FIG. 6 illustrates an example for providing a part of an image to each of a multiple number of devices in accordance with an exemplary embodiment.

As illustrated in FIG. 6, each of the multiple angle cameras capture original videos larger than the videos that can be displayed on a TV 62, i.e., one of the multiple angle cameras would capture an original video 60 that is larger than what can be displayed on the TV 62, and provide the original video 60 to the image providing server 10 or the gateway apparatus 30. The image providing server 10 or the gateway apparatus 30 edits contents to be displayed on the TV 62 by using the provided original video 60.

If the user wants to use the multiple angle service by using a device 64 other than the TV 62, the user recognizes the position of the device 64 relative to the TV 62 through the device 64 such that a partial video at the corresponding position is provided to the device 64.

When the user moves the device 64, the image providing server 10 or the gateway apparatus 30 provides a partial video corresponding to the relative position between the device 64 and the TV 62 among a multiple number of partial videos segmented from the original video 60. Here, with respect to the method for moving a screen of the device 64, the user may directly move the device 64 or move the device 64 by touching the screen of the device 64 or through a user interface menu of the device 64.

For example, as illustrated in FIG. 6, if the device 64 is positioned at a right side of the TV 62, a partial video corresponding to a right side screen outside the TV 62 is displayed matching the resolution of the device 64. If the device 64 is positioned at a left side of the TV 62, a partial video corresponding to a left side screen outside the TV 62 is displayed matching the screen of the device 64.

As another example, in the case where a group of singers are singing on a TV, and only parts of the group appear on the TV, if a viewer wants to see a person who is singing outside the TV screen, the viewer may view a partial video corresponding to the person outside the TV screen through a device by moving the device to a position of the person outside the TV screen.

As another example, in case of a quiz show program being reproduced on a TV, participants in the quiz show are arranged at left and right sides of a studio, and a host of the quiz show is present in a center of the studio. In the state that the TV screen only shows the host and the left side, if a viewer wants to see a right side outside the TV screen, the viewer may view the right side outside the TV screen through a device by moving the device to the position of the right side outside the TV screen.

Furthermore, the viewer may view a video in his/her desired video size by using screen expansion and reduction functions provided by the multiple angle service of the device. The device shows a video at a relative position to a screen being reproduced on the TV.

That is, the device reproduces a video corresponding to the relative position to the TV with respect to the video being reproduced on TV.

If the user wants to seamlessly view a certain person or position in a studio, and not the relative position to the video being reproduced on the TV, the user may view a video of the certain person or position by using a trace function of the device, regardless of the video being reproduced on the TV.

Figure 7A:
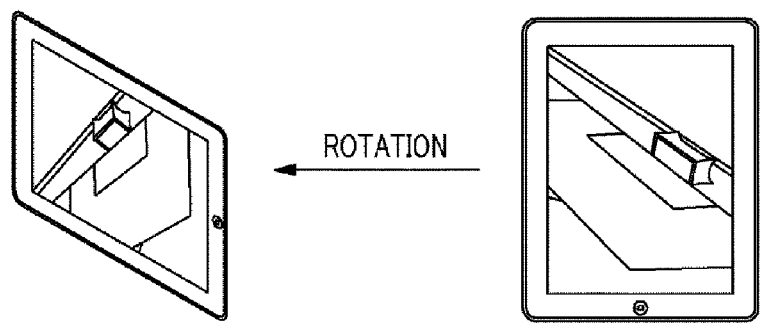
FIGS. 7A and 7B illustrate an example for displaying an angle image on screen of a device in accordance with an exemplary embodiment.
Figure 7B:
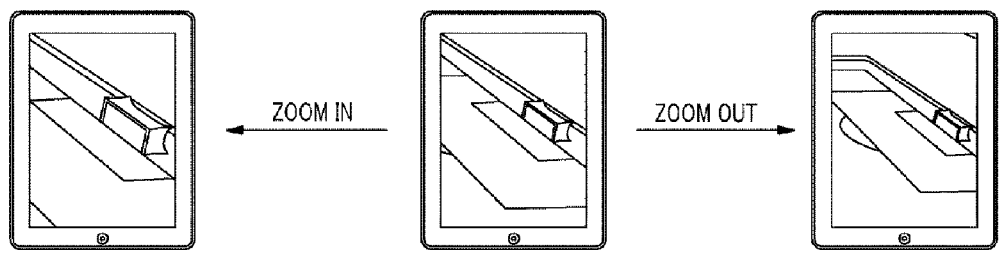

FIGS. 7A and 7B illustrate examples for displaying an angle image on a screen of a device in accordance with an exemplary embodiment.

As illustrated in FIG. 7A, when the user rotates the device, the device provides information corresponding to the position and an angle of the device to the image providing server 10 or the gateway apparatus 30 so as to show a video corresponding to the position and the angle. As illustrated in FIG. 7B, when a multiple angle video being viewed is expanded or reduced through a user interface of the device, the video being viewed can be expanded or reduced.

Figure 8:
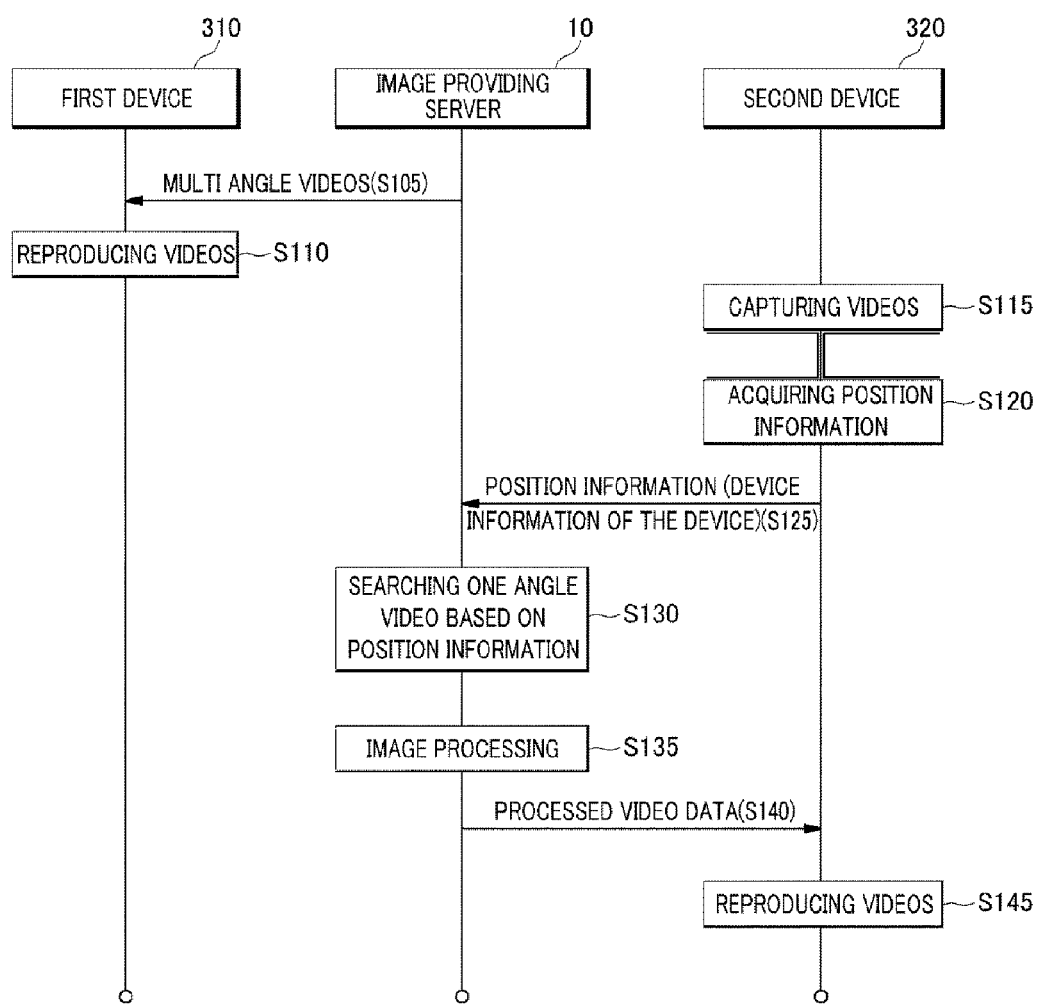
FIG. 8 is a flow chart showing a method for providing an image in accordance with an exemplary embodiment.

FIG. 8 is a flow chart showing a method for providing an image in accordance with an exemplary embodiment.

With reference to FIG. 8, the image providing server 10 in accordance with an exemplary embodiment provides the video data for the multiple angle videos captured at multiple angles to the first device 310 (S105).

The first device 310 reproduces the multiple angle videos based on the provided video data (S110).

The second device 320 captures the videos being reproduced in the first device 310 (S115).

The second device 320 sets the reference position of the first device 310 based on the captured video of the first device 310.

The second device 320 measures the position of the second device 320 by using one from among a gyro sensor, an acceleration sensor, and a terrestrial magnetism sensor.

The second device 320 determines the position information of the second device 320 relative to position information of the first device 310 based on the reference position of the first device 310 and the position of the second device 320 (S120).

The image providing server 10 receives, from the second device 320, the position information of the second device 320 relative to position information of the first device 310. In this case, the image providing server 10 may receive the device information of the second device 320 as well as the position information of the second device 320.

The image providing server 10 searches video data for a specific angle video of the multiple angle videos based on the position information of the second device 320 (S130).

The image providing server 10 performs image processing to the video data for the searched angle video based on the device information of the second device 320 (S135).

Subsequently, once the image providing server 10 provides the video data that have been subject to the image processing, to the second device 320 (S140), the second device 320 reproduces the corresponding video (S145).

In this case, the user may fix the video that he/she is viewing through the second device 320 so as to maintain the video at the fixed position. Fixing the video being viewed may be determined depending on the convenience of the user. If the user wants to receive a video at a new position, the user may provide information of the changed position to the image providing server 10 to receive a new angle video.

Figure 9:
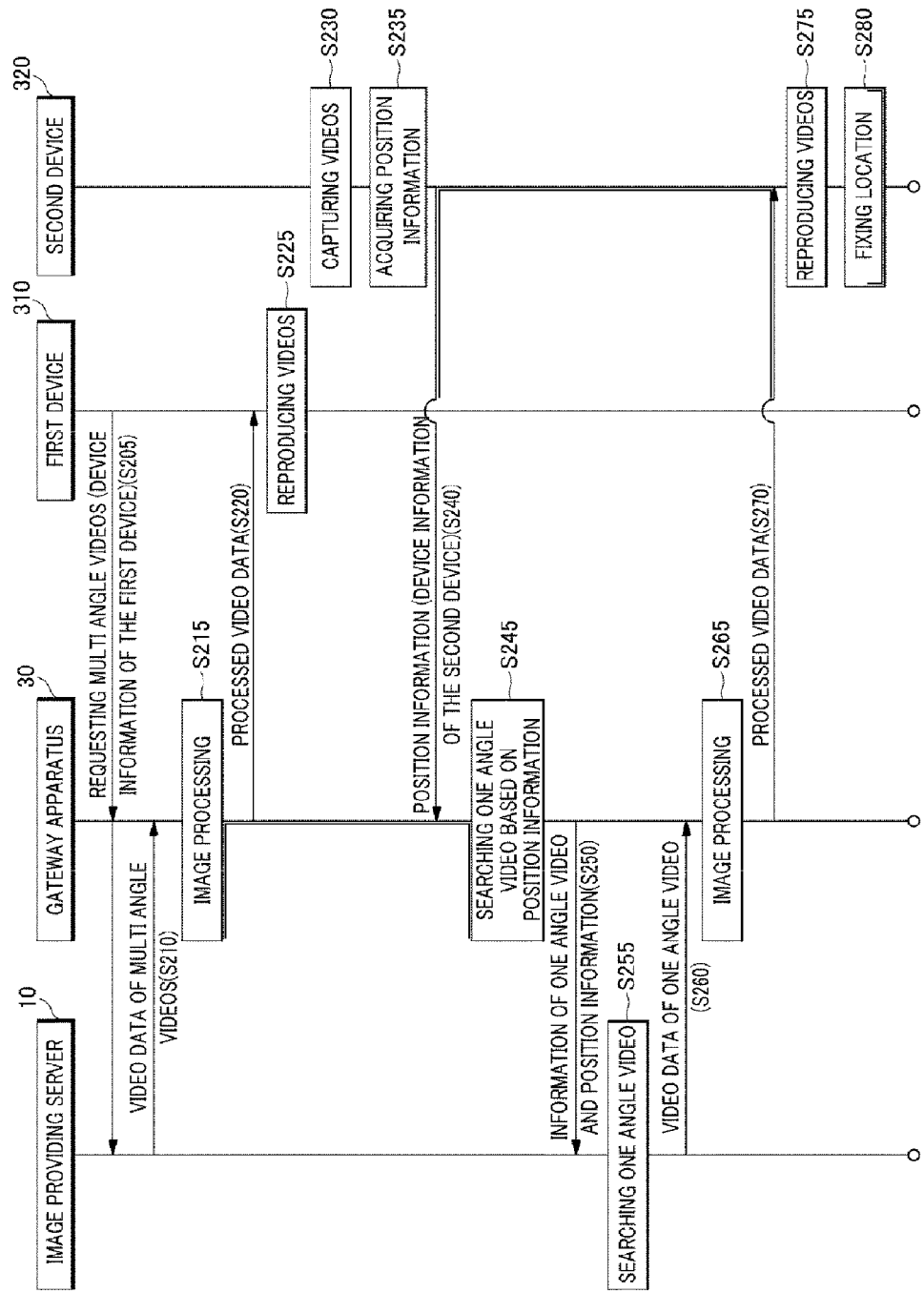
FIG. 9 is a flow chart showing a method for providing an image in accordance with another exemplary embodiment.

FIG. 9 is a flow chart showing a method for providing an image in accordance with another exemplary embodiment.

With reference to FIG. 9, the first device 310 requests the multiple angle videos captured at the multiple angles from the multiple angle video providing server 10 through the gateway apparatus 30 (S205). In this case, the first device 310 also transmits the device information of the first device 310 to the gateway apparatus 30.

Once the multiple angle video providing server 10 provides the video data for the multiple angle videos requested from the first device 310 to the gateway apparatus 30 (S210), the gateway apparatus 30 performs image processing to the video data based on the device information of the first device 310 (S215).

The gateway apparatus 30 provides the video data that have been subject to the image processing, to the first device 310 (S220). The first device 310 reproduces the videos based on the received video data (S225).

Subsequently, the second device 320 captures the videos being reproduced in the first device 310 (S230), and sets the reference position of the first device 310 based on the captured video of the first device 310.

The second device 320 measures the position of the second device 320 by using one from among a gyro sensor, an acceleration sensor, and a terrestrial magnetism sensor. Based on the reference position of the first device 310 and the position of the second device 320, the second device 320 acquires the position information of the second device 320 relative to position information of the first device 310 (S235).

The second device 320 transmits the position information of the second device 320, to the gateway apparatus 30 together with the device information of the second device 320 (S240).

The gateway apparatus 30 searches video data for the corresponding specific angle video based on the position information of the second device 320 (S245).

In this case, if the searched video data for the angle videos are not included in the video data received by the first device 310 from the gateway apparatus 30, the gateway apparatus 30 transmits information of the specific angle video requested by the user and the position information of the second device 320 to the image providing server (S250).

Subsequently, the image providing server 10 searches the corresponding angle video by using the received information related to the specific angle video and the position information of the second device 320 (S255), and transmits the searched video data for the angle video to the gateway apparatus 30 (S260).

If the searched video data for the specific angle video are included in the video data received by the first device 310 from the gateway apparatus 30, the gateway apparatus 30 may omit operations S250 to S260.

The gateway apparatus 30 performs image processing on the searched video data for the specific angle video for display in the second device 320 based on the device information of the second device 320 (S265).

The gateway apparatus 30 provides the video data that have been subject to the image processing, to the second device 320 (S270). The second device 320 reproduces the videos based on the provided video data (S275).

In this case, the user fixes the videos being viewed through the second device 320 to maintain the videos at the fixed location (S280). Here, fixing the videos may vary depending on the convenience of the user. If the user wants to receive a video at a new position, the user provides information of the changed position to the gateway apparatus 30 so as to receive a new angle video.

Figure 10:
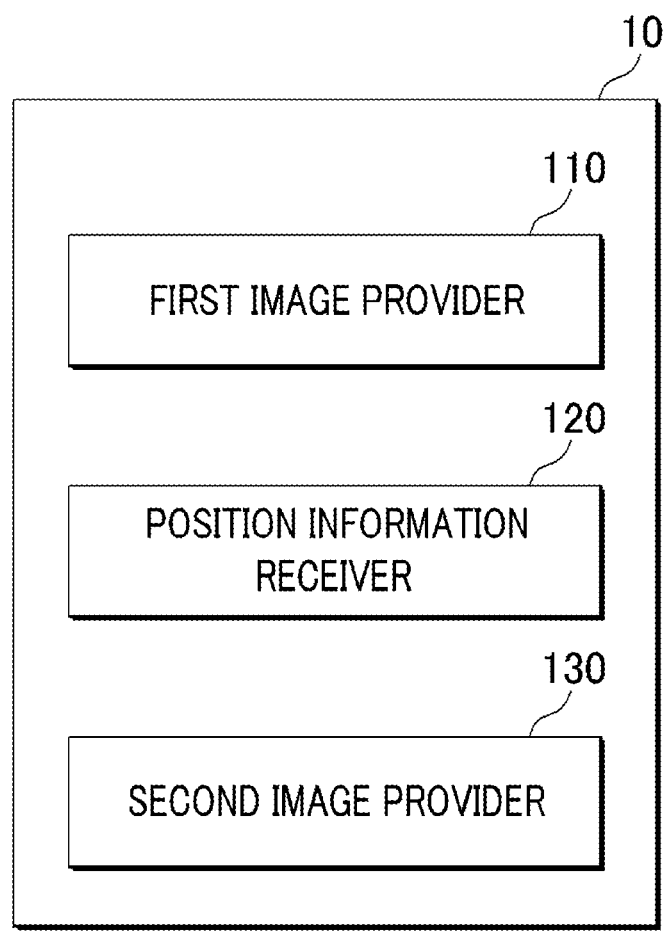
FIG. 10 is a detailed configuration view for explanation of an image providing server in accordance with an exemplary embodiment.

FIG. 10 is a detailed configuration view for explanation of an image providing server in accordance with an exemplary embodiment.

With reference to FIG. 10, the image providing server 10 includes a first image provider 110, position information receiver 120, and a second image provider 130. The image providing server is, for example, equipped with a central processing unit (CPU) and a memory. The first image provider 110, position information receiver 120, and the second image provider 130 may be implemented as a hardware component, software module, or a combination of hardware and software.

The first image provider 110 provides the video data for the multiple angle videos captured at multiple angles to the first device (not illustrated). Once the first image provider 110 provides the video data for the multiple angle videos to the first device, the first device may display the multiple angle videos on a screen of the first device based on the provided video data. The screen of the first device may display only a video of a partial area of the multiple angle videos.

The position information receiver 120 receives the position of the second device relative to position information of the first device from the second device (not illustrated). In this case, the position information receiver 120 may receive the device information of the second device as well as the position of the second device.

The second image provider 130 provides video data for the specific angle video of the multiple angle videos based on the position the second device. In this case, the specific angle video may represent a partial area of the multiple angle video.

Prior to providing the video data to the second device, the second video data provider 130 may perform image processing to the video data based on the device information of the second device for display on the second device, and provide the video data that have been subject to the image processing, to the second device.

The image providing server 10 illustrated in FIG. 10 performs the same function of the image providing server 10 illustrated in FIG. 1. Accordingly, the descriptions of the image providing server 10 illustrated in FIG. 1 are applied to the function of the image providing server 10 illustrated in FIG. 10, even though the descriptions of the image providing server 10 illustrated in FIG. 1 are omitted hereinafter. In other words, explanation of the image providing server 10 of FIG. 10, which is not provided hereinafter, is the same as the explanation provided with reference to FIGS. 1 to 8 or can be easily understood by one of ordinary skill in the art from the explanation that has been provided.

The exemplary embodiments may be embodied in a transitory or non-transitory storage medium which includes instruction codes which are executable by a computer or processor, such as a program module which is executable by the computer or processor. A data structure in accordance with the exemplary embodiments may be stored in the storage medium and executable by the computer or processor. A computer readable medium may be any usable medium which can be accessed by the computer and includes all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of the exemplary embodiments is provided for the purpose of illustration, and it will be understood by those skilled in the art that various changes and modifications may be made without changing a technical conception and/or any essential features of the exemplary embodiments. Thus, the above-described exemplary embodiments are exemplary in all aspects, and do not limit the present disclosure. For example, each component described to be of a single type can be implemented in a distributed manner. Likewise, components described to be distributed can be implemented in a combined manner.

The scope of the present inventive concept is defined by the following claims and their equivalents rather than by the detailed description of the exemplary embodiments. It shall be understood that all modifications and embodiments conceived from the meaning and scope of the claims and their equivalents are included in the scope of the present inventive concept.

What is claimed is:

1. A method for providing an image to a plurality of devices, the method comprising:
    providing a first part of the image to a first device;
    receiving, at an image providing device, second position information of a second device relative to first position information of the first device, the second position information being received from the second device; and
    providing, to the second device, a second part of the image corresponding to the second position information of the second device,
    wherein the second position information of the second device is determined based on an image that is displayed on the first device and obtained by the second device.

2. The method of claim 1,
    wherein the second position information of the second device is determined by using at least one from among a gyro sensor, an acceleration sensor, and a terrestrial magnetism sensor.

3. The method of claim 1, wherein the receiving, from the second device, the second position information of the second device includes:
    receiving, from the second device, device information of the second device.

4. The method of claim 1, wherein
    the providing, to the second device, the second part of the image comprises:
    selecting a partial image from the image based on the second position information of the second device;
    processing the partial image based on device information of the second device; and
    providing the processed partial image as the second part of the image to the second device.

5. A method for providing an image to a plurality of devices, the method comprising:
    receiving an image from a server;
    providing, to the first device, a first part of the image, the first part being processed based on device information of the first device;
    receiving, at the gateway, second position information of the second device relative to first position information of the first device, the second position information being received from the second device; and
    providing, to the second device, a second part of the image corresponding to the second position information of the second device,
    wherein the second position information of the second device is determined based on an image that is displayed on the first device and obtained by the second device.

6. The method of claim 5,
    wherein the providing to the second device comprises:
    selecting a partial image from the image based on the second position information of the second device;
    processing the partial image based on the second device information of the second device; and
    providing the processed partial image as the second part of the image to the second device.

7. The method of claim 5,
    wherein the providing to the second device comprises:
    sending, to the server, information of the image and the position information of the second device;
    receiving, from the server, the second part of the image; and
    providing the second part of the image to the second device.

8. The method of claim 7,
    wherein the second part of the image is selected, by the server, from the image based on the second position information of the second device.

9. The method of claim 5,
    wherein the second position information of the second device is determined by using at least one from among a gyro sensor, an acceleration sensor, and a terrestrial magnetism sensor.

10. The method of claim 5,
    wherein the first part of the image is synchronized with the second part of the image.

11. A method for receiving a partial image of an image by a second device, the method comprising:
    sensing second position information of the second device relative to a first position information of a first device;
    sending the sensed second position information of the second device to an image providing device; and
    receiving, from the image providing device, a partial image corresponding to the second position information of the second device,
    wherein the sensed second position information of the second device is determined based on an image that is displayed on the first device and obtained by the second device.

12. The method of claim 11,
wherein the second position information of the second device is determined by using at least one from among a gyro sensor, an acceleration sensor, and a terrestrial magnetism sensor.

13. The method of claim 11,
wherein the received partial image is displayed on a screen of the second device, and controlled based on at least one from among a rotation command, an expansion command, and a reduction command input from a user interface.

14. An apparatus for providing an image to a plurality of devices, the apparatus comprising:
   a first image provider configured to provide a first part of the image to a first device;
   position information receiver configured to receive second position information of a second device relative to first position information of the first device; and
   a second image provider configured to provide, to the second device, a second part of the image corresponding to the second position information of the second device,
   wherein the position information receiver receives the second position information from the second device, and
   wherein the second position information of the second device is determined based on an image that is displayed on the first device and obtained by the second device.

15. The apparatus of claim 14, wherein the position information receiver receives, from the second device, device information of the second device.

16. A method for displaying different angular perspectives from a particular view of a subject, on a plurality display devices, respectively, the method comprising:
   providing one angular perspective of the subject to a first display device of the plurality display devices;
   receiving, at an image providing device, second position information of a second display device of the plurality display devices, the second position information being relative to first position information of the first display device and being received from the second device; and
   providing, to the second display device, a second angular perspective of the subject based on the second position information of the second display device,
   wherein the second position information of the second display device is determined based on an image that is displayed on the first display device and obtained by the second display device.

17. The method of claim 16, wherein the subject is at least one from among an event, a scene, an activity, and a spectacle.

18. The method of claim 16, wherein the particular view is a panoramic view.

* * * * *